Figure 1:
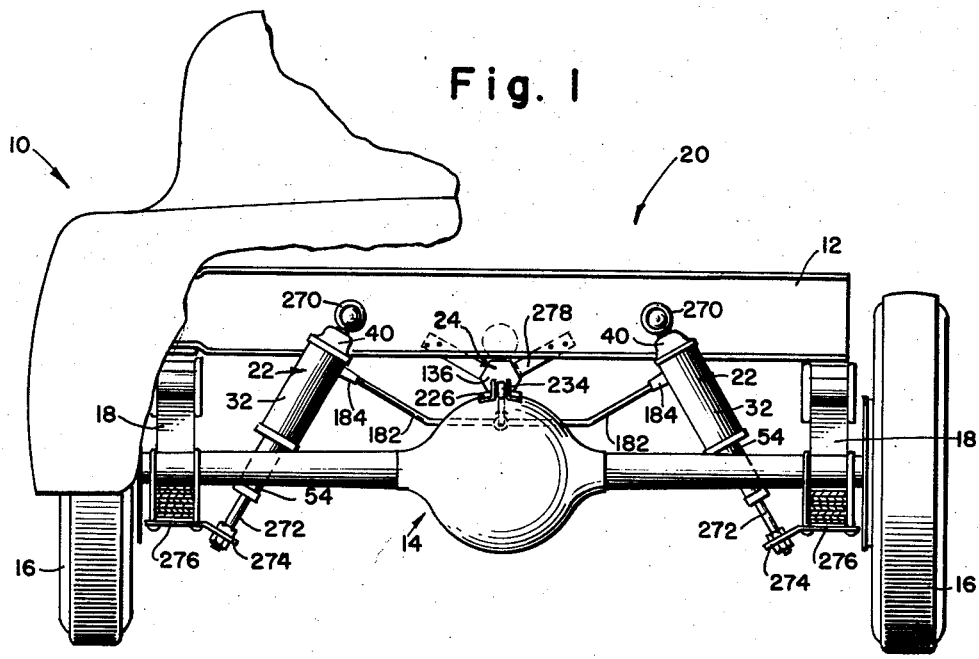

July 7, 1964

R. J. BROADWELL 3,140,098

MANUALLY CONTROLLED SELF-LEVELING SYSTEM
FOR A VEHICLE SUSPENSION

Filed Dec. 15, 1959

2 Sheets-Sheet 1

INVENTOR
ROBERT J. BROADWELL

BY Cushman, Darby & Cushman
ATTORNEYS

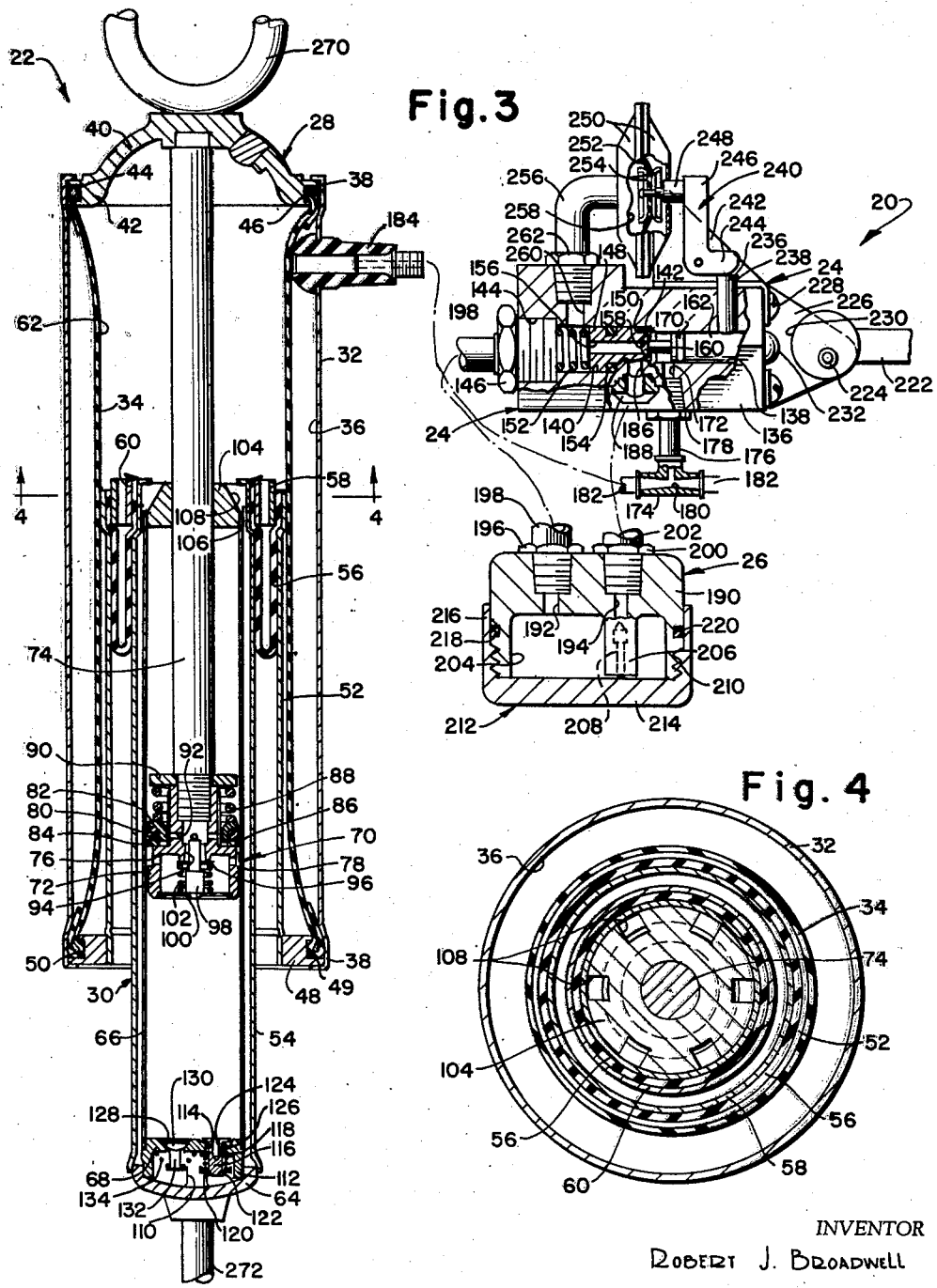

United States Patent Office 3,140,098
Patented July 7, 1964

3,140,098
MANUALLY CONTROLLED SELF-LEVELING SYSTEM FOR A VEHICLE SUSPENSION
Robert J. Broadwell, Cleveland, Ohio, assignor, by mesne assignments, to Maremont Corporation, Chicago, Ill., a corporation of Illinois
Filed Dec. 15, 1959, Ser. No. 859,613
11 Claims. (Cl. 280—6)

This invention relates to vehicles suspension, and more particularly to vehicle suspension of the type embodying air spring units and a system for adjusting such units for varying loads carried by the vehicle.

In my co-pending application Serial No. 850,957 filed November 4, 1959, now Patent No. 3,083,026, there is disclosed a combined hydro-pneumatic strut and pump damper which is particularly adapted for use as an assist unit in a conventionally suspended vehicle. In practice, two of these combined units are connected between the sprung and unsprung masses of the vehicle on opposite sides of the rear axle assembly, each unit being self-contained, that is, the hydraulic circuit and pneumatic circuit of each unit are closed systems so that there are no dynamic seals necessary in the construction.

As indicated in my co-pending application, in general, these units can be adjusted to carry the rear end of the sprung mass of the vehicle at a particular desired height for any given load by introducing air under pressure into the air chambers of the units. To accomplish this adjustment, a conventional tire valve is provided on each unit so that a conventional air hose, such as found at any filling station, could be employed to introduce compressed air into the air chambers when it became necessary to raise the position of the sprung mass, as when an excessive load is carried by the vehicle.

An object of the present invention is the provision of a means for interconnecting the pneumatic circuits of a pair of units of the type described and means for conveniently introducing air under pressure into the interconnected units.

Another disadvantage of the arrangement for adjusting the load spring height of the units disclosed in my co-pending application is that there is presented the possibility that when it is desired to exhaust air under pressure from the air chambers, as when an excessive load has been removed, more air than is necessary may be exhausted resulting in a decrease in pressure of the hydraulic circuit sufficient to cause the folded rolling sleeve seal to become damaged.

Accordingly, it is another object of the present invention to provide a means for adjusting an assist unit of the type described having valve means for controlling the introduction and exhaust of the air under pressure in accordance with the position of the sprung mass of the vehicle with respect to the unsprung mass thereof.

Another object of the present invention is the provision of a system of adjusting a hydro-pneumatic assist unit of the type described having improved means for maintaining the valve mechanism in a non-working position except when the units are being adjusted.

Still another object of the present invention is the provision of a system for adjusting a hydro-pneumatic assist unit of the type described which is simple in construction, efficient in operation, and economical to manufacture and maintain.

These and other objects of the present invention will become more apparent during the course of the following detailed description and appended claims.

The invention may best be understood with reference to the accompanying drawings wherein an illustrative embodiment is shown.

Figure 2:
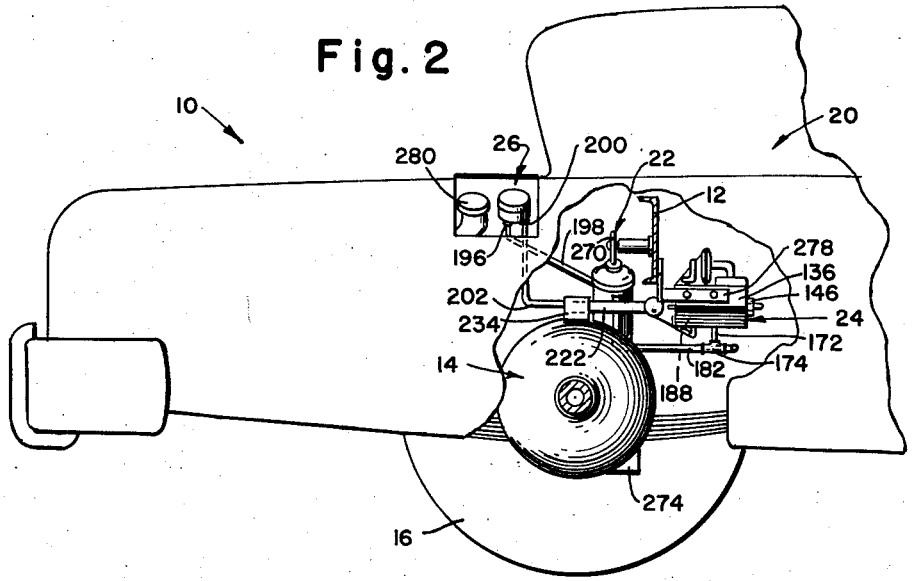

In the drawings:
FIGURE 1 is a rear elevational view of a vehicle embodying the principles of the present invention, with certain parts broken away for purposes of clearer illustration;
FIGURE 2 is a side elevational view, partly broken away, of the vehicle;
FIGURE 3 is a composite view of the component elements of the present system, the elements being shown in vertical section; and
FIGURE 4 is a cross-sectional view taken along the line 4—4 of FIGURE 3.

Referring now more particularly to the drawings, there is shown in FIGURES 1 and 2 a vehicle, generally indicated at 10, which comprises the usual sprung mass including a frame 12, and the usual unsprung mass which includes a rear axle assembly 14 having rear wheels 16 mounted on opposite ends thereof. As shown, conventional leaf springs 18 are connected between the rear axle assembly 14 and the frame 12 to provide a yielding support between the latter. The air spring suspension system of the present invention is generally indicated by the numeral 20 and comprises a pair of load-bearing air spring units 22 connected between the frame 12 and the axle assembly 14 on opposite sides thereof. As shown, the air spring units 22 constitute load bearing assists for the conventional leaf springs 18.

The system 20 of the present invention also includes a levelling valve mechanism, generally indicated at 24, which is connected between the frame 12 and the rear axle housing so as to be actuated in response to changes in the relative vertical positions of the frame and axle assembly. Finally, the present system 20 also includes a manual control, 26, which is selectively operable to render the leveling valve mechanism 24 either inoperable or operable to sense the relative vertical position of the frame and axle assembly 14 and to permit air under pressure to be introduced into or exhausted from the air spring unit in an amount sufficient to maintain the frame at a predetermined position or level with respect to the rear axle assembly.

As best shown in FIGURE 3, the air spring unit 22 includes a hydro-pneumatic strut assembly, generally indicated at 28, and a pump damper assembly, generally indicated at 30, mounted therein. The hydro-pneumatic strut assembly 28 includes an exterior tubular casing member or housing 32 having a sleeve diaphragm 34 of a flexible material, preferably rubber or the like, disposed therein and defining within the casing member an outer annular air chamber 36 constituting the air spring of the unit.

The sleeve diaphragm is mounted within the casing member 32 by any suitable means and, as shown, the ends of the casing member are formed to provide annular channels 38. Mounted within the channel 38 formed at the upper end of the casing member is an end casting or closure member 40 having a peripheral flange 42 formed thereon for engagement within the associated channel 38. An annular groove 44 is formed in the peripheral flange of the closure member 40 for receiving the adjacent end of the diaphragm 34 which is secured in the groove by means of an O-ring seal 46 of conventional construction, the diaphragm end being folded back over the O-ring seal. The securement is completed by turning down the extremity of the channel against the outer edge of the flange.

It will be noted that the inner edge of the channel provides a shoulder which cooperates with the inner edge of the annular flange to grip the folded over end of the sleeve diaphragm. Preferably, the extremity of the channel is turned down so as to provide a minimum of 20% and a maximum of 30% rubber compression between the cooperating shoulders.

At the opposite end of the casing member 32 there is provided a ring-shaped end member 48 having an annular groove 49 formed therein similar to groove 44 for receiving the opposite end of the diaphragm. As before, the end of the diaphragm is folded over an O-ring seal 50 and the extremity of the channel is turned down into engagement with the outer edge of the ring-shaped end member to secure the same within the channel and to effect securement and rubber compression of the adjacent end of the diaphragm.

Rigidly secured to the inner periphery of the ring-shaped end member 48, as by welding or the like is an inner tubular casing member 52 which extends inwardly of the outer casing member within the diaphragm 34. Mounted for longitudinal movement within the inner tubular member 52 is a tubular plunger member 54. Connected between the adjacent ends of the tubular plunger member 54 and the inner tubular member 52 is a folded rolling sleeve-type seal 56. The seal 56 is preferably made of a sleeve of flexible material, such as corded rubber or the like, however, other flexible materials may be utilized. The essential characteristics of the sleeve are that it is impervious to hydraulic fluid, capable of being folded and rolled, and nonresilient so that it will not expand to any considerable extent under pressure. One end of the seal 56 is rigidly secured to the inner end of the inner tubular member 52, as by a metal clamping ring 58, and the opposite end of the sleeve is fixedly secured to the inner end of the tubular plunger member 54, as by a metal clamping ring 60. The sleeve is folded between its secured ends, one ply of the fold engaging the interior surface of the inner tubular member 52 and the other ply of the fold engaging the exterior surface of the tubular plunger member 54.

The interior surface of the sleeve diaphragm 34, the end members 40 and 48, the exterior surface of the inner tubular member 52, the interior surface of the folded seal 56 and the interior surface of the tubular plunger member 54 define an expansible and contractible hydraulic pressure chamber 62 within the hydropneumatic strut assembly. The outwardly extending end of the tubular plunger member is suitably closed by an end casing or closure member 64.

The pump damper assembly 30 of the unit 22 includes a cylinder 66 having one end rigidly secured to the end member 64, as by a fixed base plate or member 68. Mounted within the cylinder is a valved piston, generally indicated at 70, which includes a piston body 72 having a lower hollow portion formed with a periphery for engaging the interior of the cylinder 66 and a reduced upper portion. The upper portion of the piston body is interiorly threaded to receive the threaded lower end of a piston rod 74, the upper end of which is fixed to the central interior of the closure member 40.

Extending radially through the lower portion of the piston body 72 is a plurality of circumferentially spaced compression passages 76. The outer periphery of the lower portion of the piston body adjacent the passages 76 is relieved, as indicated at 78, to permit the fluid flowing through the passages 76 to move axially therefrom. This movement of the fluid is controlled by an O-ring 80 of a diameter sufficient to engage the inner periphery of the cylinder 66. The O-ring 80 is mounted between an upper carrier ring 82 of angular cross-sectional configuration and a lower sealing ring 84 arranged to engage an upwardly facing annular seat 86 formed on the piston body between the lower portion and the reduced upper portion thereof. The lower sealing ring is resiliently urged into engagement with the seating surface 86 by means of a coil spring 88 surrounding the reduced upper portion of the piston body. The lower end of the spring engages the carrier ring 82 and the upper end thereof engages a washer 90 mounted between the lower end of the piston rod 74 and the upper extremity of the upper portion of the piston body.

Extending axially through the upper portion of the valve body at a position below the piston rod is a plurality of circumferentially spaced rebound passages 92. The rebound passages communicate with an axial valve opening 94 formed in the central portion of the valve body. The lower end of the opening 94 is arranged to be closed by means of disk valve 96. The disk valve is centrally apertured to receive a guide member 98 which is fixed to the lower end portion of the valve body 72, as by an apertured disk 100. The disk valve 96 is resiliently urged into engagement with the annular surface surrounding the opening 94 by means of a coil spring 102 mounted between the disk valve and the apertured disk.

The upper end of the cylinder 66 is closed by a disk member 104 which is centrally apertured to slidably receive the piston rod 74. The lower outer periphery of the disk member is relieved, as indicated at 106, to receive the upper end of the cylinder 66. Communicating with the relieved lower end of the disk member is a plurality of circumferentially-spaced radially extending tapered slots 108 which serve to communicate the annular space between the cylinder 66 and the tubular plunger member 54 with the hydraulic chamber 62 of the hydro-pneumatic strut assembly. The space between the cylinder 66 and the tubular plunger member 54 is communicated with the interior of the cylinder 66 by a pair of diametrically opposed openings 110 formed in a depending annular skirt portion 112 of the base plate 68.

The base plate 68 is provided with an aperture 114 having an upper annular groove therein for receiving a flanged stem member 116 which extends through the aperture and has mounted on the depending portion thereof an apertured disk valve 118. A coil spring 120 serves to resiliently urge the disk valve 118 into engagement with the annular surface surrounding the lower end of the aperture 114 and has its upper end in engagement with the disk valve and its lower end in engagement with a flange member 122 fixed to the lower end of the stem member 116. Preferably the stem member 116 has a bore 124 formed in the upper end thereof and a compression passage 126 extends radially from the bore 124 to the outer periphery of the stem member at a position above the disk valve.

The base plate 68 also has an aperture 128 formed therein which defines an upwardly facing frusto-conical valve seat. A replenishing valve 130 is disposed adjacent the valve seat 128 and has a stem 132 extending downwardly therefrom through the aperture 128. A coil spring 134 resiliently urges the replenishing valve 130 into engagement with the valve seat and has its upper end in engagement with the base plate and its lower end in engagement with a flange formed on the lowere extremity of the stem 132.

The leveling valve mechanism 20 comprises a valve body 136 which, as shown, is hexagonal in cross-section having a bore 138 extending longitudinally therethrough. A first counterbore 140 is formed in one end of the bore 138 and defines therewith an annular valve seat 142. A second counterbore 144 is provided in the end of the first counterbore 140, the second counterbore being interiorly threaded to threadedly receive a fitting 146. Mounted within the first counterbore 140 for reciprocating movement therein is a valve member 148, having an exterior frusto-conical surface 150 formed on its inner end for engaging the valve seat 142. The valve member 148 is resiliently urged inwardly of the counterbore 140 so that the frusto-conical surface thereof will engage the valve seat by means of a coil spring 152 disposed within the counterbore 140 between the valve member and the fitting. Preferably, sealing means is provided between the exterior surface of the valve member and the surface of the counterbore and, as shown, there is provided an O-ring 154 mounted in a suitable annular groove formed in the periphery of the valve member intermediate its ends.

The valve member 148 has a central bore 156 extending therethrough, the end of the bore adjacent the frusto-conical surface 150 being tapered outwardly to provide a frusto-conical valve seat 158. The valve seat 158 is arranged to be engaged by a rounded valve element 160 formed on the inner end of a second valve member 162 slidably mounted within the bore 138. The valve member 162 is preferably in the form of a cylinder having a stem of reduced diameter extending from the inner end thereof on the outer end of which the valve element 160 is integrally formed. Preferably, suitable sealing means is provided between the exterior surface of the cylindrical portion of the valve member 162 and the bore 138. As shown, such sealing means embodies an O-ring 170 mounted in a suitable annular groove formed in the periphery of the valve member.

Formed in the valve body 136 in communication with the bore 138 adjacent the valve seat 142 is a radially extending port 172 which constitutes the working port of the valve mechanism. Any suitable means may be provided for connecting this port to the air spring units and, as shown, such means embodies a T-fitting 174 having one branch connected to the port 172 as by a conduit 176 and a fitting 178. The other branches of the T-fitting 174 are intercommunicated by a restricted orifice 180 which also communicates with the working port branch. Each of the other branches has a suitable conduit 182 extending therefrom, the opposite end of which is connected with a fitting 184 communicating with the air chamber of one of the air spring units 22.

It will be seen that the engagement of the valve element 160 with the frsuto-conical surface 158 controls the communication between the working port 172 of the valve mechanism and the fitting 146 in the end of counterbore 144 which constitutes a low pressure or exhaust port of the valve. When the valve element 160 is disposed out of engagement with the valve seat 158 the working and exhaust ports are communicated permitting air in the air chambers 36 to exhaust through the leveling valve mechanism 24.

The engagement of the valve surface 150 with the valve seat 142 controls the communication between the working port 172 and a radially extending high pressure port 186 formed in the valve body in communication with the inner end of the counterbore 140 adjacent the valve seat 142. The high pressure or inlet port 186 communicates with a suitable fitting 188 threadedly engaged within the valve body.

The manual control 26 comprises an annular body 190 having a pair of parallel ports 192 and 194 formed therein. The port 192, which constitutes the low pressure port of the manual control, communicates with a fitting 196 threadedly engaged within the body, the fitting 196 being connected to one end of a conduit 198, the opposite end of which is connected with the exhaust or low pressure fitting 146 of the leveling valve mechanism 24. The port 194 communicates with a fitting 200 threadedly engaged in the annular body 190, the fitting 200 constituting a high pressure or intake fitting of the manual control and being connected to one end of a conduit 202, the opposite end of which is connected to the intake or high pressure fitting 188 of the valve mechanism 24.

The body 190 of the manual control 26 has an annular recess 204 formed therein in the end thereof remote from the fittings 196 and 200, the recess communicating with the low pressure port 192. Disposed within the recess 204 is a hollow projection 206 which preferably forms an integral part of the body 190 and is disposed in alignment with the intake port 194 so as to form an extension of the latter. Mounted within the intake port 194 within the projection 206 is a conventional air inlet valve 208 of the conventional type utilized in automobile tires and the like.

Formed on the end of the manual control body in surrounding relation to the recess 204 are exterior screw threads 210 arranged to cooperate with interior screw threads formed on an annular cap member 212. The cap member 212 includes a circular wall 214 having an annular skirt 216 extending from the periphery thereof, the interior threads being formed on the inner end of the skirt adjacent the wall 214. The outer end of the skirt is provided with a cylindrical surface having a diameter substantially equal to the diameter of the exterior surface of the manual control body. Formed on the exterior periphery of the manual control body 190 in a position adjacent the threads 210 is an annular groove 218 receiving an O-ring seal 220 which cooperates with the interior cylindrical surface of the cap to provide a seal between the latter and the body.

As indicated above, the leveling valve mechanism 24 is arranged to sense the relative position between the sprung and unsprung masses of the vehicle and to permit introduction of air under pressure into or exhaust of air under pressure from the air spring units sufficient to maintain the sprung and unsprung masses in a predetermined vertical relation. To this end, means is provided for effecting movement of the valve members 148 and 160 in response to relative movement between the sprung and unsprung masses. As shown, this means includes an arm 222 having one end pivotally connected, as at 224, to a bracket 226 secured to the valve body, by any suitable means, such as bolts 228 or the like. The end of the arm 222 adjacent the pivot 224 is provided with a cam surface 230 arranged to engage a cam surface 232 formed on the extremity of the cylindrical valve member 162 extending outwardly of the valve body bore 138. As best shown in FIGURE 2, the opposite end of the position sensitive arm 222 is pivotally connected to the central portion of the rear axle assembly 14, as indicated at 234.

The leveling valve mechanism 24 is also provided with means for locking the cam surface 232 of the valve member 162 out of the path of movement of the arm cam surface 230, such means being actuated in response to the manual control 26. As shown, this means comprises a pin 236 slidably mounted within a bore 238 formed in the valve body 136 in communication with the bore 138. Preferably, the pin 236 is made of nylon or the like and has its inner end shaped to engage the cylindrical portion of the valve member 162. The pin 236 is moved into frictional engagement with the valve member by means of a bell crank lever 240 pivotally mounted on an angularly extending portion 242 of the bracket 226. The bell crank lever includes a horizontally extending arm 244 having a cam surface engaging the end of the pin and a vertically extending arm 246 having a plunger rod 248 connected to the outer end thereof. The plunger rod forms part of a diaphragm assembly of conventional construction which includes cooperating housing parts 250 secured together with a resilient diaphragm 252 therebetween. The plunger rod 248 extends through one housing part and is connected with the central portion of the diaphragm as by suitable cup-like members 254. The opposite housing part 250 has one end of a conduit 256 connected therewith. The conduit 256 communicates an air chamber 258 defined by the associated housing part 250 and the diaphragm 252 with the counterbore 140 of the valve mechanism through a lateral port 260 formed in the valve body and a fitting 262 communicating with the port and connected to the opposite end of the conduit.

It will be understood that the component elements of the present system may be mounted on the vehicle in any suitable manner. As shown, each air spring unit 22 is provided with suitable fastening elements at its upper and lower ends so that it may be connected between the rear axle assembly and frame of the vehicle. The fastening elements may take any form and in the drawings two types of fastening elements are illustrated. As shown in FIGURE 3, the closure member 40 has rigidly secured to the upper outer extremity thereof a connecting ring 270 which is pivotally received by a suitable stud or the like carried by the frame of the vehicle. At its lower end the closure member 64 has rigidly secured to the lower outer extremity thereof, as by welding or the like, a stem connector element 272. This stem extends through an angular extension 274 of a bracket 276 which is utilized to connect the springs 18 with the rear axle assembly 14. The leveling valve mechanism may either be mounted on the frame or the rear axle assembly, preferably the former. As best shown in FIGURE 2, a suitable mounting bracket 278 is suitably fixed to the frame at the central portion thereof adjacent the rear axle assembly, such bracket being arranged to fixedly receive the leveling valve mechanism 20. As indicated above, the manual control 26 may be mounted at any convenient position on the vehicle and as best shown in FIGURE 2, it is positioned adjacent the gas tank outlet 280 of the vehicle so that it is readily available.

*Operation*

The present system is particularly adaptable for use with a source of air under pressure, which is separate from the vehicle. As shown in FIGURE 1, the manual control 26 is mounted on the vehicle at a convenient location so that it can be easily connected with conventional air hose nozzle of the type found in any filling station. As shown, the manual control is disposed adjacent the gasoline tank outlet but it will be understood that it may be located at other convenient locations on the vehicle as desired.

The manual control 26 is therefore normally operable when the vehicle is at a filling station for servicing. In general, the manual control will be utilized to effect leveling of the sprung mass of the vehicle where there are substantial changes in the static load of the unsprung mass. For example, where a trip is contemplated in which the trunk of the vehicle is loaded with heavy baggage and there is an additional back seat load in the car such as either passengers or additional baggage, the rear end of the car may tend to ride "too low," resulting in the rear overhang of the vehicle scraping the street as when going up steep driveways or the like, and in causing the headlight beams to shine too high. Thus, assuming that such a load has just been imposed on the vehicle, the present system is operable to bring the sprung mass back into a predetermined vertical position with respect to the unsprung mass in the following manner. It will be noted that with an added load of the type described above, the sprung mass of the vehicle will be moved downwardly with respect to the unsprung mass, so that the position sensing arm will have moved counterclockwise as viewed in FIGURE 3, thus effecting a movement of the valve member 162 inwardly which, in turn, by virtue of the engagement of valve element 160 with the valve seat 158 moves the valve member 148 against the action of spring 152 with the valve element 160 in engagement with the valve seat 158. This movement of the valve member 148 serves to communicate the air chambers of the air spring units 22 through the working and high pressure ports 172 and 186 of the valve mechanism with the inlet port 194 of the manual control 26. It will be noted that when the cap member 212 is disposed on the body 190, air is prevented from exhausting from the air chambers 36 due to the engagement of the valve element 160 with the valve seat 158 and that the air pressure in the air chambers can not escape through the inlet port 194 because of the air valve 208 disposed therein.

When the attendant removes the cap member and attaches the end of the air hose in the filling station to the projection 206, the air valve 208 is opened and the pressure of the air hose is then communicated with the air chambers 36 of the air spring units through the high pressure and working ports of the valve mecahnism, causing the diaphragm 34 to expand. The expansion of the diaphragm 34 in turn effects a displacement of the plunger member 54 outwardly of the hydraulic chamber 62, thus raising the sprung mass of the vehicle. This upward movement of the sprung mass will continue until such time as the position-sensing arm 222 moves in a counterclockwise direction as viewed in FIGURE 2 sufficient to permit the valve surface 150 of the valve member 148 to engage the valve seat 142, thus interrupting the communication between the inlet port of the manual control and the air chambers of the air spring units. After the sprung mass of the vehicle has thus been raised to a desired level as determined by the position-sensing arm 222, the attendant removes the air hose and then replaces the cap member 212. It will be noted that the cap member 212 seals off the exhaust port 192 of the manual control 26 while the inlet port 194 of the manual control is sealed off by the air valve 208.

During the initial travel of the vehicle after the cap member has been replaced, the sprung mass of the vehicle will have dynamic relative movements with respect to the unsprung mass of the vehicle. During at least a portion of these dynamic movements, the position sensing arm will move in a counterclockwise direction as viewed in FIGURE 2 beyond the null position of the valve members 148 and 162. During such movements, the surface 150 of the valve member 148 remains in engagement with valve seat 142 while the element 160 of the valve member 162 moves away from the valve seat 158 due to the pressure acting on the resultant inwardly facing surface of the valve member 162 adjacent the stem. Movement of the valve element 160 away from the valve seat 158 communicates the air chambers 36 of the air spring units 22 with the exhaust port 192 of the manual control through the working and low pressure ports 172 and 144. Thus, during the initial travel of the vehicle, the air pressure within the recess 204 therefore builds up to a value substantially equal to the air pressure in the air chambers 36, which increase in pressure is communicated with the air chamber 258 of the diaphragm assembly through the low pressure port 144 and port 260 of the valve mechanism. An increase of pressure within the air chamber 258 results in an outward movement of the plunger rod 248 which in turn effects a clockwise pivotal movement of the ball crank lever 240. In this way, the horizontal arm 244 of the bell crank lever 240 is operable to move the locking pin 236 into frictional engagement with the valve member 162. With such pressure applied to the locking pin, the valve member 162 will be locked or retained into the innermost position as a result of the engagement of the cam surface 230 with the cam surface 232. This position of the valve mechanism is illustrated in FIGURE 3 and it will be noted that the cam surface 232 of the valve member is locked out of the path of movement of the cam surface 230.

The above action will occur after a relatively short distance of travel of the vehicle and the air pressure lost in the air chambers 36 resulting from the increase in pressure within the manual control recess 204 and air chamber 258 is not enough to significantly affect the relative position that the sprung mass is supported on the unsprung mass by the air spring units 22. Thus, the valve member 162 will be retained in a stationary position rather than moving in response to the movement of the position responsive arm 222 after the initial period of travel indicated above. The advantage of locking the valve member 162 in a stationary position is that the seal 170 then becomes a static seal, thereby eliminating the leakage problems which would most likely occur if this seal had to be effective under dynamic conditions such as when the valve member moves at all times with the position sensing arm 222.

After the trip has been completed and the excess load is removed, the sprung mass will be moved upwardly as a result of this decrease in load. The operator then merely removes the cap member 214, allowing the increased pressure in the recess 204 of the manual control to exhaust to atmosphere. The relieving of the pressure in the recess 204 in turn relieves the pressure in the air chamber 258, thus relieving the pressure applied to the locking pin 236 by the bell crank lever 240, which in turn unlocks or releases the valve member. With the sprung mass of the vehicle riding too high, the position sensing arm 222 will be disposed in a clockwise direction as viewed in FIGURE 3 past its null position. When the locking pin 236 is released, the spring 152 will serve to move the valve member 148 inwardly until the surface 150 engages the valve seat 142. Thereafter, the pressure in the working port 172 will move the valve member 162 outwardly by virtue of the differential surface provided by the extremity of the cylindrical portion of the valve member until the cam surface 232 engages the cam surface 230. This movement of the valve member 162 communicates the air chamber 36 of the air spring units with the exhaust port 192 of the manual control through the working and low pressure ports 172 and 144. In this way air pressure is allowed to exhaust from the air chambers 36 until such time as the sprung mass of the vehicle reaches its proper predetermined position, at which time the cam surface 230 is operable to move the element 160 of the valve member 162 into engagement with the valve seat 150 of the valve member 148, thus shutting off the exhaust of pressure when the sprung mass has reached its proper posiiton. The operator can then replace the cap member 214 which will effect the locking of the valve mechanism into a static position in the manner indicated above during the next initial travel of the vehicle.

It thus will be seen that the objects of this invention have been fully and effectively accomplished. It will be realized, hovever, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a vehicle having a sprung mass including a frame and an unsprung mass including a wheel, means including an air spring unit operatively connected between said masses for yieldably supporting said sprung mass on said unsprung mass, said air spring unit including an expansible and retractable air chamber, a leveling valve mechanism carried by one of said masses for controlling the introduction of air under pressure into and exhaust of air under pressure from said air chamber, means operatively connected with said valve mechanism and mounted with respect to said masses so as to sense the relative position of the latter for actuating said valve mechanism to control the movement of air under pressure into and out of said air chamber in accordance with the relative position of said masses, and manual control means operable in one position to permit air under pressure to be introduced and exhausted through said valve mechanism into and out of said air chamber and in a second position to close off exhaust of air under pressure through said valve mechanism from said air chamber, said manual control means including a normally closed air inlet valve operable to be opened by engagement of a conventional filling station air hose nozzle when said manual control means is disposed in said first position, said valve mechanism including a valve body having a working port, an inlet port and an exhaust port formed therein, and means for controlling communication between said ports including a member extending outwardly from said valve body for engagement by said position sensing means when said manual control means is disposed in said first position so as to be moved in response to said position-sensing means and means operable only when said manual control mean is disposed in said second position for locking said member in a stationary position out of engagement with said position-sensing means.

2. The combination as defined in claim 1 wherein said manual control means comprises a body having an exhaust port therein communicating with said valve mechanism exhaust port, and means for closing said control means exhaust port to prevent exhaust of air under pressure from said air chamber through said leveling valve mechanism.

3. The combination as defined in claim 2 wherein said control means body has a recess formed therein within which said inlet air valve is disposed, said control means exhaust port communicating with said recess, and wherein said exhaust port closing means comprises a cap member engageable with said control means body to cover said inlet air valve and seal said recess.

4. The combination as defined in claim 1 wherein said locking means comprises a diaphragm assembly mounted on said valve body having means including a flexible diaphragm, defining an air chamber communicating with said valve body exhaust port, a pin mounted in said valve body for movement into and out of frictional engagement with said member, and motion transmitting means between said diaphragm and said pin for moving the latter in response to an increase in pressure in said diaphragm assembly air chamber.

5. The combination as defined in claim 1 wherein said position sensing means comprises an arm pivotally mounted on said valve body, said arm having a cam surface for engaging the outwardly extending end of said member at one end thereof and its opposite end adapted to be pivotally connected with the other of said masses.

6. In a vehicle having a sprung mass including a frame and an unsprung mass including a wheel, means including an air spring unit operatively connected between said masses for yieldably supporting said sprung mass on said unsprung mass, said air spring unit including an expansible and retractable air chamber, a leveling valve mechanism carried by one of said masses for controlling the introduction of air under pressure into and exhaust of air under pressure from said air chamber, means operatively connected with said valve mechanism and mounted with respect to said masses so as to sense the relative position of the latter for actuating said valve mechanism to control the movement of air under pressure into and out of said air chamber in accordance with the relative position of said masses, and manual control means operable in one position to permit air under pressure to be introduced and exhausted through said valve mechanism into and out of said air chamber and in a second position to close off exhaust of air under pressure through said valve mechanism from said air chamber, said manual control means including a normally closed air inlet valve operable to be opened by engagement of a conventional filling station air hose nozzle when said manual control means is disposed in said first position, said air spring unit comprising a plunger part, a closed hollow body part having an opening telescopically receiving said plunger part, a folded rolling sleeve seal between said plunger and said hollow body parts closing the plunger part receiving opening of the latter, a sleeve of flexible material within said hollow body dividing the same into said air chamber and a hydraulic chamber communicating with said seal, means fixed with respect to one of said parts defining a cylindrical pump damper chamber within said parts, a pump damper piston slidable in said pump damper chamber, a piston rod fixed to said piston and extending from one side thereof through said pump damper chamber, said piston rod being fixed with respect to the other of said parts whereby said pump damper piston will move within said pump damper chamber in response to the telescopic movement of said parts, passage means intercommunicating the ends of said pump damper chamber on opposite sides of said pump damper piston, and means communicating said pump damper chamber with said hydraulic chamber.

7. In a vehicle having a sprung mass including a frame and an unsprung mass including a rear axle assembly, means for yieldably supporting said sprung mass on said unsprung mass including a pair of air spring assist units connected between said frame and said rear axle assembly at opposite end portions of the latter, each of said air spring units including an expansible and retractable air chamber, said air chambers being restrictingly communicated with each other, a leveling valve mechanism carried by one of said masses for controlling the introduction of air under pressure into and exhaust of air under pressure from said air chambers, means operatively connected with said valve mechanism and mounted with respect to said masses so as to sense the relative position of the latter for actuating said valve mechanism to control the movement of air under pressure into and out of said air chambers in accordance with the relative position of said masses, and manual control means operable in one position to permit air under pressure to be introduced and exhausted through said valve mechanism into and out of said air chambers and in a second position to close off exhaust of air under pressure through said valve mechanism from said air chambers, said manual control means including a normally closed air inlet valve operable to be opened by engagement of a conventional filling station air hose nozzle when said manual control means is disposed in said first position, each of said air spring assist units comprising a tubular casing having an end closure member on one end thereof, the opposite end portion of said casing providing an axially elongated annular sealing surface, a tubular plunger member mounted in telescoping relation to said casing and having an axially elongated exterior sealing surface adjacent the inner end portion thereof disposed in spaced relation to said interior sealing surface and an end closure member on the outer end thereof, a sleeve seal having opposite ends thereof fixed respectively to said casing and said plunger member and folded intermediate its ends between said anular surfaces in rolling contact therewith, a sleeve of flexible material within said casing dividing the interior space defined by said casing, said plunger member, said end closure members and said seal into said air chamber at an outer annular position and an inner hydraulic chamber, a pump damper cylinder disposed within said hydraulic chamber having one end thereof fixed to one of said end closure members, a pump damper piston slidably mounted within said cylinder, a piston rod fixed to said piston and extending from one side thereof outwardly of said cylinder, the outwardly extending end of said piston rod being fixed to the other of said end closure members, valved passage means in said piston communicating the ends of said cylinder on opposite sides of said piston, and valved passage means between the end of said cylinder opposite from the piston rod end thereof and said hydraulic chamber.

8. In a vehicle having a sprung mass including a frame and an unsprung mass including a wheel, means including a self-damping load supporting strut unit operatively connected between said masses for yieldingly supporting said sprung mass on said unsprung mass, said strut unit comprising a plunger part, a closed hollow body part having an opening telescopically receiving said plunger part, a folded rolling sleeve seal between said plunger and said hollow body parts closing the plunger part receiving opening of the latter, a sleeve of flexible material within said hollow body dividing the same into an annular gas chamber and a hydraulic chamber communicating with said seal, means fixed with respect to one of said strut parts defining a cylindrical pump damper chamber within said parts, a pump damper piston slidable in said pump damper chamber, a piston rod fixed to said piston and extending from one side thereof through said pump damper chamber, said piston rod being fixed with respect ot the other of said strut parts whereby said pump damper piston will move within said pump damper chamber in response to the telescopic movement of said strut parts, passage means communicating the ends of said pump damper chamber on opposite sides of said pump damper piston, means communicating said pump damper chamber with said hydraulic strut chamber, a leveling valve mechanism carried by one of said masses for controlling the introduction of fluid under pressure into and exhaust of fluid under pressure from one of said strut chambers, means operatively connected with said valve mechanism and mounted with respect to said masses so as to sense the relative position of the latter for actuating said valve mechanism to control the movement of fluid under pressure into and out of said one strut chamber in accordance with the relative position of said masses, and manual control means operable in one position to permit fluid under pressure to be introduced and exhausted through said valve mechanism into and out of said one strut chamber and in a second position to close off exhaust of fluid under pressure through said valve mechanism from said one strut chamber.

9. In a vehicle having a sprung mass including a frame and an unsprung mass including a wheel, means including a self-damping load supporting strut unit operatively connected between said masses for yieldingly supporting said sprung mass on said unsprung mass, said strut unit comprising a plunger part, a closed hollow body part having an opening telescopically receiving said plunger part, sealing means between said plunger and said hollow body parts closing the plunger part receiving opening of the latter, a sleeve of flexible material within said hollow body dividing the same into an annular gas chamber and a hydraulic chamber communicating with said sealing means, means fixed with respect to one of said strut parts defining a cylindrical pump damper chamber within said parts, a pump damper piston slidable in said pump damper chamber, a piston rod fixed to said piston and extending from one side thereof through said pump damper chamber, said piston rod being fixed with respect to the other of said strut parts whereby said pump damper piston will move within said pump damper chamber in response to the telescopic movement of said strut parts, passage means communicating the ends of said pump damper chamber on opposite sides of said pump damper piston, means communicating said pump damper chamber with said hydraulic strut chamber, a leveling valve mechanism carried by one of said masses for controlling the introduction of fluid under pressure into and exhaust of fluid under pressure from one of said strut chambers, means operatively connected with said valve mechanism and mounted with respect to said masses so as to sense the relative position of the latter for actuating said valve mechanism to control the movement of fluid under pressure into and out of said one strut chamber in accordance with the relative position of said masses, and manual control means operable in one position to permit fluid under pressure to be introduced and exhausted through said valve mechanism into and out of said one strut chamber and in a second position to close off exhaust of fluid under pressure through said valve mechanism from said one strut chamber.

10. In a vehicle having a sprung mass including a frame and an unsprung mass including a wheel, means including a self-damping load supporting strut unit operatively connected between said masses for yieldingly supporting said sprung mass on said unsprung mass, said strut unit comprising a tubular casing having an end closure member on one end thereof, a tubular plunger member mounted in telescoping relation to said casing and having an end closure member on the outer end thereof, a sleeve seal having opposite ends thereof fixed respectively to said casing and said plunger member and folded intermediate its ends, sealing means within said casing dividing the interior space defined by said casing, said plunger member, said end closure members and said seal into an air chamber defined at least in part by the interior periphery of said casing and a hydraulic chamber defined at least in part by the interior periphery of said plunger member; a damper cylinder disposed within said hydraulic chamber having one end thereof fixed to one of said end closure members; a damper piston slidably mounted within said cylinder; a piston rod fixed to said piston and extending from one side thereof outwardly of said cylinder, the outwardly extending end of said piston rod being fixed to the other of said end closure members; passage means communicating the ends of said cylinder on opposite sides of said piston; and means communicating said cylinder with said hydraulic chamber; a leveling valve mechanism carried by one of said masses for controlling the introduction of fluid under pressure into and exhaust of fluid under pressure from one of said chamber, means operatively connected with said valve mechanism and mounted with respect to said masses so as to sense the relative position of the latter for actuating said valve mechanism to control the movement of fluid under pressure into and out of said one chamber in accordance with the relative position of said masses, and manual control means operable in one position to permit fluid under pressure to be introduced and exhausted through said valve mechanism into and out of said one chamber and in a second position to close off exhaust of fluid under pressure through said valve mechanism from said one chamber.

11. In a vehicle having a sprung mass including a frame and an unsprung mass including a wheel, means including a self-damping load supporting strut unit operatively connected between said masses for yieldingly supporting said sprung mass on said unsprung mass, said strut unit comprising a tubular casing having an end closure member on one end thereof, a tubular plunger member mounted in telescoping relation to said casing and having an end closure member on the outer end thereof, a seal between said casing and said plunger member, sealing means within said casing dividing the interior space defined by said casing, said plunger member, said end closure members and said seal into an air chamber defined at least in part by the interior periphery of said casing and a hydraulic chamber defined at least in part by the interior periphery of said plunger member; a damper cylinder disposed within said hydraulic chamber having one end thereof fixed to one of said end closure members; a damper piston slidably mounted within said cylinder; a piston rod fixed to said piston and extending from one side thereof outwardly of said cylinder, the outwardly extending end of said piston rod being fixed to the other of said end closure members; passage means communicating the ends of said cylinder on opposite sides of said piston; and means communicating said cylinder with said hydraulic chamber; a leveling valve mechanism carried by one of said masses for controlling the introduction of fluid under pressure into and exhaust of fluid under pressure from one of said chambers, means operatively connected with said valve mechanism and mounted with respect to said masses so as to sense the relative position of the latter for actuating said valve mechanism to control the movement of fluid under pressure into and out of said one chamber in accordance with the relative position of said masses, manual control means operable in one position to permit fluid under pressure to be introduced and exhausted through said valve mechanism into and of said one chamber and in a second position to close off exhaust of fluid under pressure through said valve mechanism from said one chamber, and means for preventing actuation of said valve mechanism by said position sensing means when said manual control means is disposed in said second position and for permitting actuation of said valve mechanism by said position sensing means when said manual control means is disposed in said first position.

References Cited in the file of this patent

UNITED STATES PATENTS

| | | |
|---|---|---|
| 1,555,199 | Gouirand | Sept. 29, 1925 |
| 1,965,053 | Powers | July 3, 1934 |
| 2,275,608 | Brisbane | Mar. 10, 1942 |
| 2,802,664 | Jackson | Aug. 13, 1957 |
| 2,812,954 | Lyon | Nov. 12, 1957 |
| 2,844,384 | Jackson | July 22, 1958 |
| 2,887,324 | Jackson | May 19, 1959 |
| 2,904,346 | Herbenar | Sept. 15, 1959 |
| 2,987,311 | Schilling | June 6, 1961 |

FOREIGN PATENTS

| | | |
|---|---|---|
| 214,922 | Australia | May 2, 1958 |